United States Patent
Yang et al.

(10) Patent No.: US 9,638,854 B2
(45) Date of Patent: May 2, 2017

(54) BACKLIGHT SOURCE, LIQUID CRYSTAL DISPLAY PANEL AND LIQUID CRYSTAL DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Feng Bai, Beijing (CN); Yiming Zhao, Beijing (CN); Bing Bai, Beijing (CN); Xiao Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 210 days.

(21) Appl. No.: 14/488,342

(22) Filed: Sep. 17, 2014

(65) Prior Publication Data

US 2015/0285987 A1    Oct. 8, 2015

(30) Foreign Application Priority Data

Apr. 4, 2014  (CN) .......................... 2014 1 0137348

(51) Int. Cl.
  *G02F 1/133*  (2006.01)
  *F21V 8/00*   (2006.01)
  *G02F 1/1335* (2006.01)
(52) U.S. Cl.
  CPC ......... *G02B 6/0078* (2013.01); *G02B 6/0031* (2013.01); *G02B 6/0055* (2013.01);
  (Continued)

(58) Field of Classification Search
  CPC .......................... G02F 1/133; G02F 1/133605
  See application file for complete search history.

(56) References Cited

U.S. PATENT DOCUMENTS

| 4,630,895 A | 12/1986 | Abdala, Jr. et al. | |
|---|---|---|---|
| 9,016,923 B2 * | 4/2015 | Kosaka | G02B 6/008 362/613 |
| 2012/0224106 A1 * | 9/2012 | Kosaka | G02B 6/008 348/725 |

FOREIGN PATENT DOCUMENTS

| CN | 1702367 A | 11/2005 |
|---|---|---|
| CN | 101097054 A | 1/2008 |

(Continued)

OTHER PUBLICATIONS

Third Office Action regarding Chinese application No. 201410137348.5, dated Apr. 29, 2016. Translation provided by Dragon Intellectual Property Law Firm.

(Continued)

*Primary Examiner* — Timothy L Rude
(74) *Attorney, Agent, or Firm* — Harness, Dickey & Pierce, P.L.C.

(57) ABSTRACT

The embodiment of the present invention relates to the field of display technology, and provides a backlight source, a liquid crystal display panel and a liquid crystal display device. The backlight source comprises at least two light guide plates and a light source corresponding to the respective light guide plate. The light guide plates are joined to form a light guide plane, and the light source is arranged at the periphery of the corresponding light guide plate and does not transmit light to the other light guide plate. The light source corresponding to the respective light guide plate can be controlled by a control circuit. According to the present invention, it is able to reduce the power consumption of the screen and the backlight source and improve the endurance of the backlight source.

14 Claims, 2 Drawing Sheets

(52) U.S. Cl.
CPC ......... *G02B 6/0068* (2013.01); *G02B 6/0071* (2013.01); *G02B 6/0073* (2013.01); *G02F 1/133603* (2013.01); *G02F 1/133605* (2013.01); *G02F 1/133606* (2013.01)

(56) References Cited

FOREIGN PATENT DOCUMENTS

| CN | 201652057 U | 11/2010 |
| CN | 101915396 A | 12/2010 |
| CN | 201680272 U | 12/2010 |
| CN | 102798016 A | 11/2012 |
| CN | 202532338 U | 11/2012 |
| JP | 2002367420 A | 12/2002 |

OTHER PUBLICATIONS

First Office Action regarding Chinese application No. 201410137348.5, dated Oct. 26, 2015. Translation provided by Dragon Intellectual Property Law Firm.

Second Office Action regarding Chinese application No. 201410137348.5, dated Jan. 14, 2016. Translation provided by Dragon Intellectual Property Law Firm.

* cited by examiner

BACKLIGHT SOURCE, LIQUID CRYSTAL DISPLAY PANEL AND LIQUID CRYSTAL DISPLAY DEVICE

CROSS-REFERENCE TO RELATED APPLICATION

The present application claims a priority of the Chinese patent application No. 201410137348.5 filed on Apr. 4, 2014, which is incorporated herein by reference in its entirety.

FIELD OF THE INVENTION

The embodiment of the present invention relates to the field of display technology, in particular to a backlight source, a liquid crystal display panel and a liquid crystal display device.

DESCRIPTION OF THE PRIOR ART

Each liquid crystal smart phone or computer includes a liquid crystal display panel, in which a backlight source is provided. Currently, a light guide plate of the backlight source is of an integral structure. Along with the popularization of the smart phone and the enhancement to application functions, more power is consumed by the existing liquid crystal display panel and backlight source. As a result, the endurance of the smart phone fails to keep pace with the diversified and complex applications. For the smart phone, the power consumption control and energy saving have become hot research topics.

How to save the energy of a battery of the smart phone as possible, thereby to supply power for a long period of time, has become a focus.

SUMMARY OF THE INVENTION

An object of the present invention is to provide a backlight source, a liquid crystal display panel and a liquid crystal display device, so as to overcome such drawbacks in an existing liquid crystal smart phone or tablet PC as high power consumption and poor endurance.

In one aspect, the embodiment of the present invention provides a backlight source, comprising at least two light guide plates and a light source corresponding to the respective light guide plate. The light guide plates are joined to form a light guide plane, and the light source is arranged at the periphery of the corresponding light guide plate and does not transmit light to the other light guide plate. The light source corresponding to the respective light guide plate can be controlled by a control circuit.

Further, a reflective surface is provided at a joint of the light guide plates.

Further, a joining surface of the light guide plates is the reflective surface.

Further, a reflective plate is provided at the joint of the light guide plates, and a side of the reflective plate that is in contact with the light guide plate is the reflective surface.

Further, the light guide plane is formed by joining two, three or four light guide plates.

Further, the backlight source is a direct-type or edge-type backlight source.

Further, the light sources corresponding to the respective light guide plates are arranged symmetrically or asymmetrically at two sides of the light guide plane.

Further, the light source is a LED light bar or a CCFL light bar.

Further, the light sources are arranged symmetrically at both sides of the light guide plane and opposite to the joint of the two light guide plates. Two reflective surfaces opposing the light sources arranged at both sides of the light guide plane are provided at the joint of the two light guide plates.

Further, the light guide plane is formed by joining three light guide plates end to end, and the three light guide plates are arranged in a row. The light sources are arranged outside the light guide plates at both sides, and outside the middle light guide plate. The reflective surfaces are provided at the joining surfaces of the light guide plates.

Further, the light guide plane is formed by joining two light guide plates, and the light sources corresponding to the light guide plates are arranged at two sides of the light guide plane that are not opposite to each other.

Further, the backlight source is a direct-type backlight source, and the light guide plane is formed by joining two light guide plates. The light sources are arranged below the light guide plane and the two light guide plates.

In another aspect, the embodiment of the present invention provides a liquid crystal display panel comprising the above-mentioned backlight source.

In yet another aspect, the embodiment of the present invention provides a liquid crystal display device comprising the above-mentioned liquid crystal display panel.

According to the backlight source and the liquid crystal display panel of the present invention, at least two light guide plates are joined to form the light guide plane, and the light sources that can be controlled individually are arranged outside the light guide plates, respectively. The light source for the respective light guide plate does not transmit light to the other light guide plate, i.e., each light guide plate can be lighted up individually. As a result, it is able to light up the appropriate light guide plate in accordance with the requirements of different regions in the light guide plane, rather than to light up a full screen, thereby to reduce the power consumption of the screen and the backlight source and improve the endurance of the backlight source. The present invention is applicable to the display device such as a liquid crystal smart phone or a tablet PC with a battery. Further, the reflective surfaces are arranged at the joint of the light guide plates, and as a result, it is able to prevent light leakage, thereby to improve the brightness of the backlight source.

Wherein: 1 light guide plate 2 light source 3 reflective plate 31 reflective surface.

DETAILED DESCRIPTION OF THE PREFERRED EMBODIMENTS

The present invention will be described hereinafter in conjunction with the drawings and the embodiments. The following embodiments are used for illustrative purpose only, but shall not be used to limit the scope of the present invention.

A backlight source of the embodiments comprises at least two light guide plates and a light source corresponding to the respective light guide plate. The light guide plates are joined to form a light guide plane, and the light source is arranged at the periphery of the corresponding light guide plate (i.e., outside or below the light guide plate), and the light source corresponding to the respective light guide plate does not transmit light to the other light guide plate. The light source corresponding to the respective light guide plate can be controlled by a control circuit. To be specific, the light source corresponding to the respective light guide plate may be controlled by a separate control circuit, or an identical control circuit may be provided with several branches, each of which has a switch, so as to individually control the light sources corresponding to the light guide plates on a one-to-one basis. The light source corresponding to the respective light guide plate is a light bar, optionally a LED light bar or a cold cathode fluorescent lamp (CCFL) light bar.

In the backlight source of the embodiments of the present invention, at least two light guide plates are joined to form the light guide plane, and the individually-controlled light source corresponding to the respective light guide plate does not emit light to the other light guide plate, i.e., each light guide plate can operate individually. As a result, it is able to light up an appropriate region of a screen in accordance with the requirements of different regions in the light guide plane, rather than to light up a full screen, thereby to reduce the power consumption of the screen and the backlight source and improve the endurance of the backlight source.

The backlight source may be of a direct-type or an edge-type, and there are two or more light guide plates. The light sources corresponding to the light guide plates may be arranged at two sides of the light guide plane that are opposite to each other or at any side, and below the light guide plates, in accordance with the type of the backlight source as well as the arrangement and the number of the light guide plates. The present invention will be described hereinafter in conjunction with several optional embodiments.

First Embodiment

Figure 1:
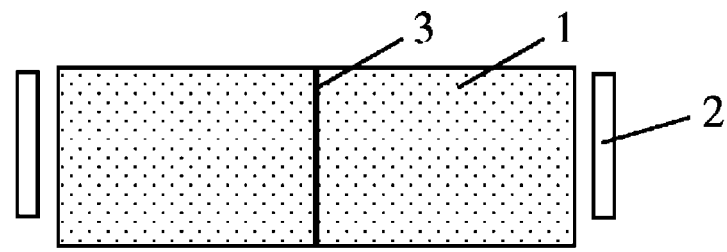
FIG. 1 is a top view of a backlight source according to the first embodiment of the present invention.
Figure 2:
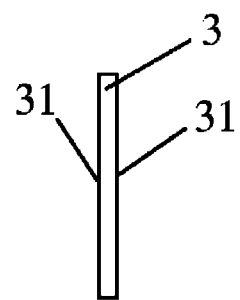
FIG. 2 is a top view of a reflective plate according to the first embodiment of the present invention.

As shown in FIGS. 1 and 2, in this embodiment, the backlight source is of an edge-type, and the light guide plane is formed by joining two light guide plates 1. The light sources 2 are symmetrically arranged at two sides of the light guide plane, and oppose a joint of the two light guide plates 1. The light source 2 corresponding to the respective light guide plate 1 can be controlled individually by a control circuit. Two reflective surfaces 31 are provided at the joint of the two light guide plates 1, and oppose the light sources 2 arranged at two sides of the light guide plane. The reflective surfaces 31 may be directly formed on a joining surface of the two light guide plates, or a reflective plate 3 may be arranged at the joint of the two light guide plates 1 and the reflective surfaces 31 may be arranged at both sides of the reflective plate 3 that are in contact with the light guide plates 1. In other words, the reflective plate includes two reflective surfaces, which oppose the light sources at two sides of the light guide plane, respectively. When the light source is lighted up, the reflective surface opposite the light source will fully reflect the light therefrom.

The light sources 2 corresponding to the light guide plates 1 are controlled individually. When the light source 2 corresponding one of the light guide plates 1 is lighted up, the light will be reflected by the reflective surface 31 to the light guide plate, so as to enhance the brightness of the light guide plate. Meanwhile, the light from the light guide plate is blocked by the reflective plate and will not be transmitted to the other light guide plate. As a result, it is able to individually control the two light guide plates and light up an appropriate region of the screen in accordance with actual requirements, thereby to reduce the power consumption of the screen and the backlight source and improve the endurance of the backlight source.

Alternatively, the reflective surface is made of a high-reflective material, e.g., silver, aluminum, titanium dioxide or silicon dioxide.

Second Embodiment

Figure 3:
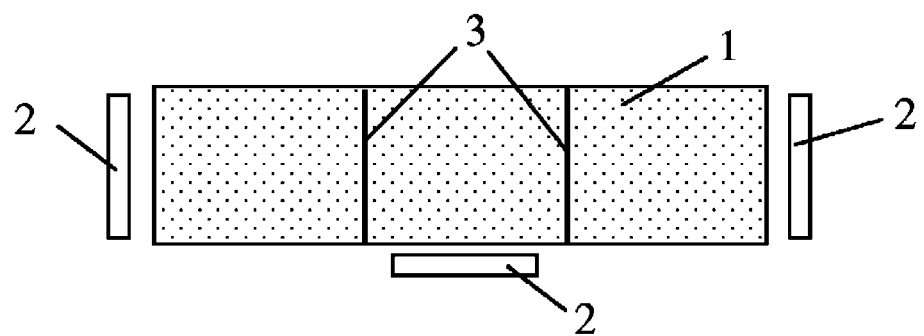
FIG. 3 is a top view of the backlight source according to the second embodiment of the present invention.

As shown in FIG. 3, in this embodiment, the backlight source is of an edge-type, and the light guide plane is formed by joining three light guide plates 1 end to end. The three light guide plates 1 are arranged in a row, and the light sources 2 are arranged outside the light guide plates 1 at both sides, and outside the middle light guide plate. The reflective surfaces 31 are provided at the joining surfaces of the light guide plates 1. The reflective surfaces 31 may be directly formed at the joining surfaces of two light guide plates, or the reflective plate 3 may be arranged at the joint of two light guide plates 1 and the reflective surfaces 31 may be arranged at both sides of the reflective plate 3 that are in contact with the light guide plates 1. The light sources 2 corresponding to the light guide plates at both sides are arranged outside the light guide plates and opposing the joining surfaces, while the light source corresponding to the middle light guide plate 1 is arranged at two side or any side perpendicular to the joining surface. The light source corresponding to each light guide plate can be controlled by the control circuit individually, the reflective surfaces are provided at the joints of the three light guide plates. When the light source corresponding to one light guide plate is lighted up, the reflective surface will fully reflect the light therefrom, and the light will not be transmitted to the other light guide plates. As a result, the other regions of the screen will not be lighted up.

In this embodiment, the reflective surface is made of an identical material to that in the first embodiment.

Third Embodiment

Figure 4:
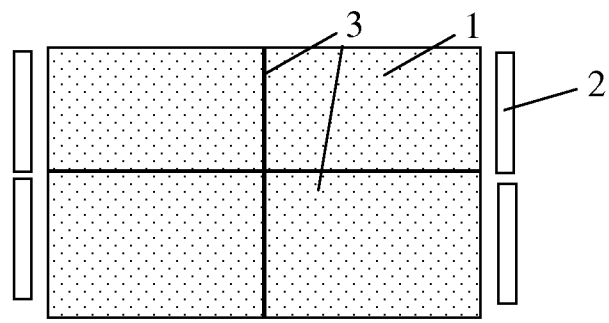
FIG. 4 is a top view of the backlight source according to the third embodiment of the present invention.

As shown in FIG. 4, in this embodiment, the backlight source is of an edge-type, and the light guide plane is formed by joining four light guide plates 1. The light sources 2 corresponding to the outside of the respective light guide plates 1 are symmetrically arranged at both sides of the light guide plane. The light source 2 corresponding to the respective light guide plate 1 can be controlled by the control circuit individually, and the reflective surfaces 31 are arranged at the joints of the four light guide plates 1. The reflective surfaces 31 may be directly formed on the joining surfaces of the four light guide plates, or the reflective plates 3 may be arranged at the joints of the four light guide plates 1 and the reflective surfaces may be arranged at both sides of the reflective plate 3 that are in contact with the light guide plates 1. When the light source corresponding to the light guide plate is lighted up, the region of the screen opposite thereto will not be lighted up due to a blockage effect of the reflective plate.

In this embodiment, the reflective surface is made of an identical material to that in the first embodiment.

Fourth Embodiment

Figure 5:
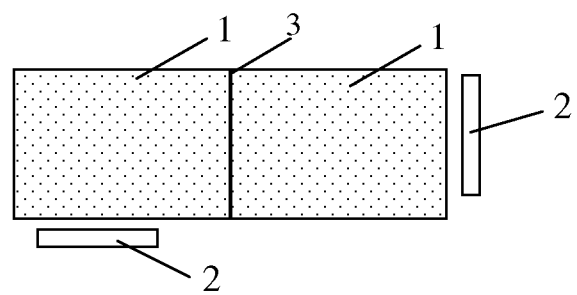
FIG. 5 is a top view of the backlight source according to the fourth embodiment of the present invention.

As shown in FIG. 5, in this embodiment, the backlight source is of an edge-type, and the light guide plane is formed by joining two light guide plates 1. The light sources 2 are arranged outside the respective light guide plates 1, and asymmetrically arranged at two sides of the light guide plane, i.e., they are arranged at two sides of the light guide plane that are not opposite to each other. Two reflective surfaces 31 are arranged at the joint of the light guide plates 1. The reflective surfaces 31 may be directly formed on the joining surface of the light guide plates, or the reflective plate 3 may be arranged at the joint of the light guide plates 1 and the reflective surfaces 31 may be arranged at both sides of the reflective plate 3 that are in contact with the light guide plate 1. The light source 2 corresponding to the outside of the respective light guide plate 1 can be controlled by the control circuit individually. The light sources 2 corresponding to the light guide plates 1 are not arranged at the planes opposite to each other, and when the light source corresponding to the light guide plate is lighted up, the light will not be transmitted to the other light guide plate. As a result, when the light source corresponding to the light guide plate is lighted up, the other light guide plate will not be lighted up.

In this embodiment, the reflective surface is made of an identical material to that in the first embodiment.

Fifth Embodiment

Figure 6:
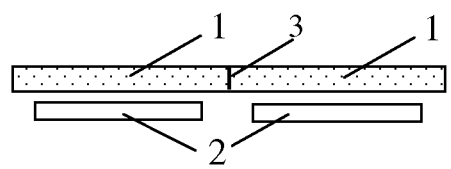
FIG. 6 is a side view of the backlight source according to the fifth embodiment of the present invention.

As shown in FIG. 6, in this embodiment, the backlight source is of a direct-type, the light guide plane is formed by joining two light guide plates 1. The light sources 2 corresponding to the respective light guide plates 1 are arranged below the light guide plane, and each light source 2 below the light guide plate 1 can be controlled by the control circuit. The reflective surfaces 31 are arranged at the joint of the light guide plates 1, so as to prevent light leakage. The reflective surfaces 31 may be directly formed at the joining surface of the two light guide plates 1, or the reflective plate 3 may be arranged at the joint of the light guide plates 1 and the reflective surfaces 31 may be arranged at both sides of the reflective plate 3 that are in contact with the light guide plates 1. When the light source corresponding to one light guide plate is lighted up, the other light guide plate will not be lighted up. As a result, it is able to light up an appropriate light guide plate in accordance with the requirements of different regions in the light guide plane, rather than to light up the full screen, thereby to reduce the power consumption of the screen and the backlight source and improve the endurance of the backlight source.

In this embodiment, the reflective surface is made of an identical material to that in the first embodiment.

It is to be noted that, the above embodiments are merely optional ones, and in these embodiments the number of the light guide plates, the arrangement of the light sources and the arrangement of the reflective surfaces shall not be limited, as long as the light source corresponding to the light guide plate can be controlled individually and will not transmit light to the other light guide plate. All the technical solutions capable of achieving this function shall be included in the scope of the present invention.

The embodiment of the present invention further provides a liquid crystal display panel comprising the above-mentioned backlight source.

The embodiment of the present invention further provides a liquid crystal display device comprising the above-mentioned liquid crystal display panel. The liquid crystal display device may be a mobile phone or a tablet PC.

The backlight source and the display panel of the present invention are applicable to the display device such as a liquid crystal smart phone or a computer with a battery. At least two light guide plates are joined to form the light guide plane, and the light sources that can be controlled individually are arranged at the outer side of the light guide plates. The light source for the respective light guide plate does not emit light to the other light guide plate, i.e., each light guide plate can be lighted up individually. Hence, it is merely required to light up the appropriate light guide plate in accordance with the requirements of different regions in the light guide plane, rather than to light up a full screen. As a result, it is able to reduce the power consumption of the screen and the backlight source, thereby to improve the endurance thereof. Further, the reflective surface is arranged at the joint of the light guide plates, and as a result, it is able to prevent light leakage, thereby to improve the brightness of the backlight source.

The above are merely the optional embodiments of the present invention. It should be appreciated that, a person skilled in the art may make further improvements and modifications without departing from the principle of the present invention, and these improvements and modifications shall also be considered as the scope of the present invention.

What is claimed is:

1. A backlight source, comprising at least two light guide plates and a light source corresponding to the respective light guide plate, wherein
   the light guide plates are joined to form a light guide plane,
   the light guide plane is formed by joining three light guide plates end to end, and the three light guide plates are arranged in a row,
   the light source is arranged at the periphery of the corresponding light guide plate and does not transmit light to the other light guide plate,
   the light sources are arranged outside the light guide plates at both sides, and outside the middle light guide plate,
   reflective surfaces are provided at the joining surfaces of the three light guide plates, and
   the light source corresponding to the respective light guide plate is controlled by a control circuit individually.

2. The backlight source according to claim 1, wherein a joining surface of the light guide plates is the reflective surface.

3. The backlight source according to claim 1, wherein a reflective plate is provided at the joint of the light guide plates, and
   a side of the reflective plate that is in contact with the light guide plate is the reflective surface.

4. The backlight source according to claim 1, wherein the backlight source is an edge-type backlight source.

5. The backlight source according to claim 1, wherein the light sources corresponding to the respective light guide plates are arranged symmetrically or asymmetrically at two sides of the light guide plane.

6. The backlight source according to claim 1, wherein the light source is a LED light bar or a CCFL light bar.

7. The backlight source according to claim 1, wherein
the light sources are arranged symmetrically at both sides of the light guide plane and opposite to the joint of the two light guide plates, and
two reflective surfaces being opposite to the light sources arranged at both sides of the light guide plane are provided at the joint of the two light guide plates.

8. The backlight source according to claim 1, wherein
the light guide plane is formed by joining two light guide plates, and
the light sources corresponding to the two light guide plates are respectively arranged at two sides of the light guide plane that are not opposite to each other.

9. The backlight source according to claim 1, wherein
the backlight source is a direct-type backlight source,
the light guide plane is formed by joining two light guide plates, and
the light sources are arranged below the light guide plane and the two light guide plates.

10. A liquid crystal display panel comprising the backlight source according to claim 1.

11. The liquid crystal display panel according to claim 10, wherein
a joining surface of the light guide plates is the reflective surface.

12. The liquid crystal display panel according to claim 10, wherein
a reflective plate is provided at the joint of the light guide plates, and
a side of the reflective plate that is in contact with the light guide plates is the reflective surface.

13. The liquid crystal display panel according to claim 10, wherein
the backlight source is an edge-type backlight source.

14. A liquid crystal display device comprising the liquid crystal display panel according to claim 10.

* * * * *